July 4, 1961  T. P. GOSLIN  2,990,898
FEEDING AND WEIGHING APPARATUS
Filed March 30, 1959  3 Sheets-Sheet 1

INVENTOR:
THOMAS P. GOSLIN
BY:
Beau, Brooks, Buckley & Beau,
ATTORNEYS.

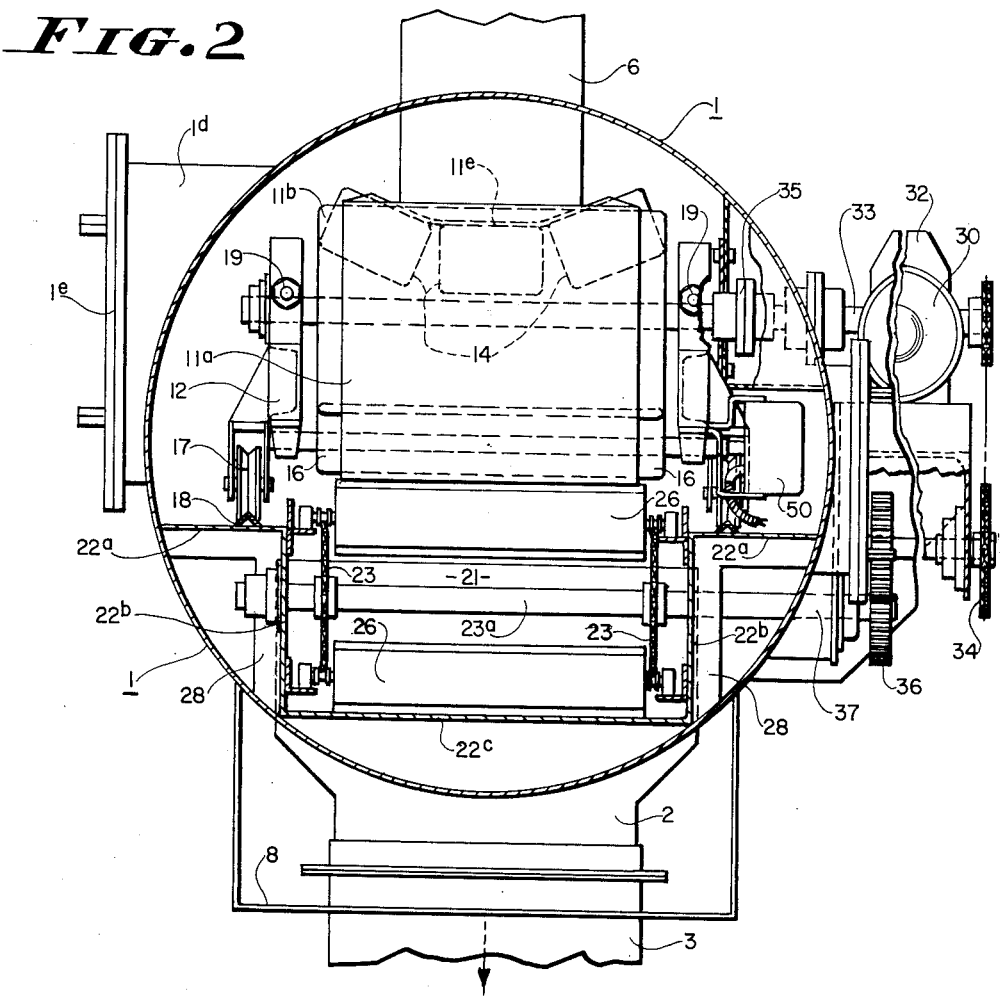

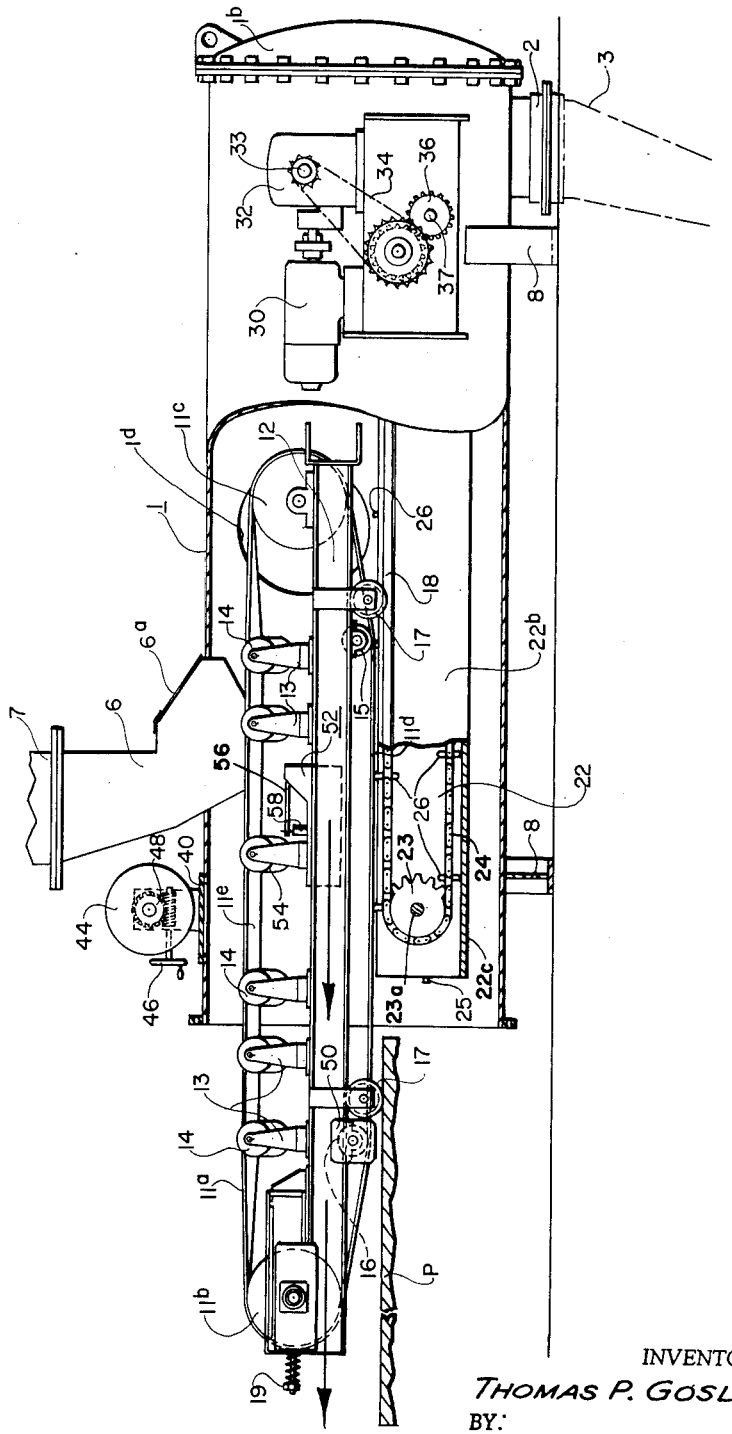

United States Patent Office 2,990,898
Patented July 4, 1961

2,990,898
FEEDING AND WEIGHING APPARATUS
Thomas P. Goslin, Pittsford, N.Y., assignor, by mesne assignments, to Streeter-Amet Company, Grayslake, Ill., a corporation of Illinois
Filed Mar. 30, 1959, Ser. No. 802,836
9 Claims. (Cl. 177—16)

This invention relates to the automatic feeding of bulk materials, and more particularly relates to apparatus for feeding and weighing bulk materials continuously passing therethrough at a high rate.

The present novel apparatus is applicable to the conveying and weighing of any bulk material, but for the sake of disclosing a practical embodiment and use of the apparatus, the invention is illustrated in connection with the feeding and weighing of fuel to coal-burning furnaces of the type employed in the generation of steam power. This embodiment is not to be considered as a limitation on the scope of the invention.

In connection with the feeding of coal to such a furnace, it is desirable to measure gravimetrically the weight of the coal while it is being continuously conveyed, the coal subsequently being pulverized and blown into the furnace with the correct proportion of air to effect optimum combustion. This feeding process should be continuous and should also be compatible with analogous power plant control systems wherein steam-demand signals can be used to establish the proper primary and secondary air supplies to the furnace.

It is a major object of this invention to provide a bulk material feeding and weighing apparatus wherein the feeding and weighing is carried on continuously. This feature is of particular importance since continuous feed provides the maximum output per unit time with no interruptions in the handling operation. In addition, a continuous feeder requires a minimum of space since there is no requirement of accumulation of material into weighing buckets, storage chambers or other bins or hoppers. The constant motion also somewhat simplifies the handling of bulk materials since the materials themselves are less apt to "bridge and pack" if they are kept in continuous motion. Furthermore, continuous motion reduces the transient shocks and other wear and tear inherent in equipment of the intermittently operating type. Since the wear and tear is reduced reliability is greater and also control is simplified because the process variables are continuous, slowly-varying functions rather than discontinuous erratic functions. The slowly-varying continuous functions lend themselves especially well to modern analog measuring and control systems.

It is another major object of the invention to provide the combination of a continuously operating apparatus and an efficient continuous weight-rate measuring and integrating system. The present apparatus includes as major sub combinations at least one weighing unit of the type shown in co-pending patent application relating to "Weighing Conveyors," Serial No. 598,304, filed July 16, 1956; or of the modified type of "Weighing Conveyor" in pending application Serial No. 788,359, now abandoned, filed January 22, 1959, either one of which units employs an electrical "Weighing Control" of the type disclosed in co-pending patent application Serial No. 624,083, filed November 23, 1956 now Patent No. 2,857,126. The actual integration of the continuously measured weight and rate of feed is performed by an electrical circuit of the type shown in co-pending patent application entitled "Material Conveyor," Serial No. 782,960, filed December 24, 1958 and disclosing a system which provides a reading of integrated weight, or else as disclosed in co-pending application entitled "Servo Control System," Serial No. 786,126, which case shows a circuit which integrates the weight and rate signals and actuates a controller to control the feed rate as desired.

It is a further object of the invention to provide a pressure-resistant tank for housing the conveyor and measuring equipment, which tank is sealed during normal operation and is of heavy construction which will withstand a furnace blowback pressure of 50 lbs. per square inch. The tank is equipped with end covers, a weighing platform access door located on one side, and such other recess doors as may be expedient. There is also a discharge outlet for feeding the coal from the conveyor and weigher to a pulverizer or other receiver of the bulk material. A steel-clad inlet chute is located on top of the tank above the conveyor, the chute communicating with other coal chutes through which a supply of coal is constantly fed to the belt conveyor located inside of the tank. The conveyor and associated weighing mechanisms are mounted on a track which is carried on a frame located within the tank whereby upon opening one of the end covers the material conveyor can be pulled out of the tank.

It is another object of the invention to provide a scraper conveyor consisting of a frame, a scraper plate made of a metal sheet and a plurality of scrapers suspended beneath the return run of the material conveyor and moving in the same direction therewith but at a somewhat different speed so that relative scraping motion occurs between the scrapers and the return run of the belt whereby the external surface of the latter is cleaned of any bulk material which might otherwise tend to stick to the belt.

Other objects and advantages of the invention will become apparent from the following discussion of the drawing wherein:

FIG. 2 is an enlarged cross-sectional view taken through the end of the tank and showing in end elevation the conveyor and other equipment located therewithin.

FIG. 3 is a side elevation of the weighing and conveying apparatus wherein the left end cover has been removed and the conveyor has been pulled partway out of the tank, the side wall of the tank being partially broken away to show the portion of the conveyor remaining therewithin.

FIG. 4 is a schematic diagram of the electrical weight-rate equipment showing its relationship to the conveyor located within the tank.

Figure 1:
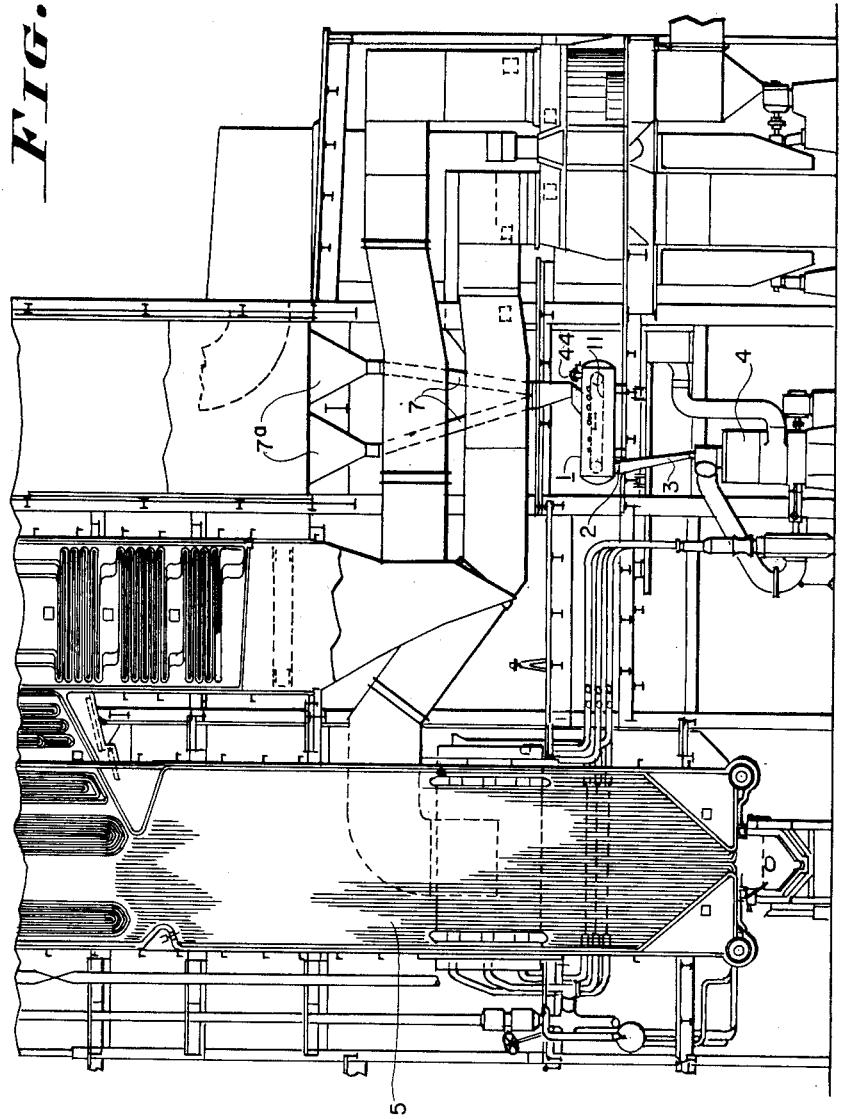
FIG. 1 is an elevation view of a large steam furnace installation showing the relationship of the novel weighing and feeding apparatus to the main furnace structure.

Referring now to the drawings, the novel feeding apparatus comprises a tank 1 made of heavy gauge steel and designed to withstand the high pressures which can occur during furnace blowback. The tank is sealed by two end closures 1a and 1b which are bolted to flanges located at each end of the tank in a manner well known per se. At one end of the tank where is located an outlet 2 including a flange which is coupled to a discharge chute 3 which leads from the bottom of the tank 1 to a pulverizer 4, the pulverizer being shown in FIG. 2. The pulverized coal is then passed from the pulverizer 4 through a fan where it is mixed with the proper portion of air and blown into the combustion chamber of the furnace, which furnace is equipped with a plurality of boiler tubes 5 creating the desired steam.

The tank 1 also includes on its top a feed inlet chute 6 which is coupled by standard flange couplings to one or more coal chutes 7 through which a continuous supply of coal is fed to the conveyor within the tank which will be hereinafter described. The tank is supported on feet 8 which in turn rest on some portion of the structure which supports the furnace and feed means.

Within the tank 1 is a belt conveyor 11 including a belt 11a which is tensioned around end rollers 11b and 11c in the conventional manner. The end rollers 11b and 11c are journaled in bearings on a frame 12 which also supports a plurality of spaced brackets 13 which in turn journal a plurality of troughed idlers 14 which support the conveying run 11e of the belt 11a as can be seen in FIG. 2 in dotted lines. The return run 11d of the conveyor belt 11a is displaced downwardly by a roller 15 which is supported on the frame 12, also by a roller 16 which forms a part of the belt speed pickup which will be hereinafter discussed. The frame 12 which supports the conveyor is in turn supported on rollers 17 which roll on spaced trackways 18 located on opposite sides of the frame. Tensioners 19 are provided at the left end of the conveyor 11 for the purpose of spring-loading the roller 11b to maintain the proper tension on the belt 11a. When the left end cover 1a is removed from the tank 1, the conveyor 11 can be rolled out of the tank onto any suitable platform P, FIG. 3, to provide access to the belt conveyor and associated mechanism for the sake of maintenance. An access port 1d, FIGS. 2 and 3, is provided in the tank 1 for access to the structure therewithin when the tank is otherwise closed, the port 1d being closed by a cover 1e.

Beneath the frame of the belt conveyor 11 is located a scraper conveyor 21 which comprises a frame 22 including two longitudinally disposed platforms 22a, FIG. 2, and two vertical webs 22b which are joined along their lower edges by a bottom plate 22c, these parts being best seen in FIG. 2. The side webs 22b of the frame support shafts 23a which at each end support two spaced sprockets 23 around which left side and right side chains are tensioned to provide a continuous conveyor beneath the conveyor belt 11a. The chains 24 may be correctly and uniformly tensioned by spring-loaded tensioners which pull the shaft 23a outwardly, so as to maintain satisfactory tension. The chain conveyor is rotated by means to be hereinafter discussed in a direction such that the upper run of the chains 24 travels in the same direction as the lower run 11d of the belt 11a but at a different rate therefrom. A plurality of scrapers 26 are connected between the right and left chains 24 and these scrapers are spaced at intervals therealong such that the scrapers 26 located along the upper run of the chains of the conveyor 21 scrape the lower surface of the return run 11d of the belt and dislodge any material adhering thereto so that the material will fall down into the bottom of the chain conveyor frame and lie on the bottom plate 22c. The scrapers 26 located on the bottom run of the chains 24 move to the right and therefore toward the outlet 2 at the bottom of the tank 1. The motion to the right of the scrapers 26 on the lower run of the chains 24 continuously moves the scrapings dislodged from the bottom of the belt 11a and sweeps them into the outlet 2 of the tank 1. In this manner, material is cleaned from the belt 11a so that the same material never passes the weighing station twice, which duplication of weighing readings would, of course, produce errors in the accuracy of the measurements.

The frame of the scraper conveyor is supported in the tank on brackets 28 and the upper platforms 22a of the scraper conveyor frame in turn support the tracks 18 on which the rollers 17 travel, the rollers 17 in turn supporting the frame 12 of the belt conveyor.

A drive unit for the conveyors is located on the outside of the tank and comprises a motor 30 coupled with a gear reducer 32 which drives by way of a sprocket and chain assembly 34 a lower gear 36. A shaft 37 carrying the gear 36 extends through the tank and drives the scraper chain conveyor, and the shaft 33 which extends transversely through the gear reducer 32 extends into the tank and is coupled with means 35 for driving the upper belt conveyor 11. A protective cover may enclose the chain and sprocket drive 34. The ratios in the chain and sprocket drive 34 are selected such that the lower shaft 37 rotates somewhat more slowly than the upper shaft 33 and therefore relative motion is provided between the scrapers 26 and the lower run 11d of the conveyor belt so that the latter is cleaned by the former.

Near the left end of the tank is located an access hole having a cover plate 40 bolted thereover, the cover plate also supporting spaced upstanding brackets 42 which in turn support reel means 44 which can be manually rotated by a crank 46 which drives the reel 44 through reduction gearing 48, FIG. 3. This reel 44 serves the purpose of storing a calibration chain (not shown) which can be lowered through the opening when the cover plate 40 is removed so that the motion of the conveyor belt 11a toward the right will carry the chain down to the rightmost end of the conveyor. When the chain is thus extended, the conveyor belt will be loaded sufficiently that the tension of the belt can be tested for the purpose of adjusting its contact with the roller 16, FIG. 3, which in turn drives the belt speed pickup tachometer 50. After the calibration of the belt speed pickup tachometer to a null condition, the chain can be rewound on the reel 44 for storage.

A weighing unit 52 is located between the conveying run 11e and the return run 11d of the belt 11a. The particular details of this weighing unit 52 form no part of the present invention having been set forth in the copending applications mentioned above; however, the unit itself does form a part of some of the combinations of elements which comprise the present invention. This weighting unit 52 includes an idler 54 which underlies a point of the conveying run 11e of the belt. The idler 54 is supported on a specially calibrated spring 56 and actuates a transducer 58 which in effect measures the deflection of the spring 56 under the load of the weight of bulk material passing the roller 54 on the belt at any particular instant of time. The displacement measuring transducer 58 and the belt speed measuring tachometer 50 provide signals which are fed into a totalizing circuit of the type shown in FIG. 4 for the purpose of integrating the weight and rate signals in order to provide a reading of the actual amount of fuel which passes the apparatus. The structure of the weighting unit 52 shown in the present drawings in fully described and claimed in copending patent application Serial No. 598,304, supra, although this is not the only type of weight measuring apparatus that can be employed. Another satisfactory type of weighing unit which differs structurally is that shown in the disclosure of copending patent application Serial No. 788,359, supra.

The particular circuit shown in FIG. 4 of the present drawings is a composite of the subjects matter of copending patent applications Serial No. 782,960 and Serial No. 786,126, supra.

The integrating system shown in FIG. 4 comprises the belt speed pickup 50 which takes the form of a tachometer driven by the idler 16 resting on the return run 11d of the belt 11a. The belt speed measurement is accomplished with a constant-frequency variable-amplitude electronic tachometer of the type used in modern computers. This tachometer has an extremely linear output through a speed range of 100:1 and is completely temperature-stabilized.

To provide an electric signal proportional to the load on the conveyor belt, a differential transformer, the transducer 58, is coupled to the idler 54 mounted on the spring 56. The differential transformer, which is a position measuring device, has a linearity and stability comparable with that of the tachometer. The high proportional limit, 110,000 lbs. per square inch of the spring 56, allows practical low-stress operating levels where hysteresis and set are less than .01%. The tachometer 50 measuring the belt speed is used as the power source for the transducer 58 and therefore, the output of the differential transformer represents the product of the belt speed and the belt load which in turn represent the weight-rate measurement which is desired.

The integration with respect to time of this weight-rate signal is accomplished by a velocity servo mechanism including a summing network 61, an amplifier 62, a servo motor 64 which motor drives a velocity tachometer 66, a digital counter 68, and, if desired, a motor speed regulator 69 for regulating the speed of the motor 30. The output of the velocity tachometer 66 is fed back to a summing network 61 where its amplitude is subtracted from the amplitude of the weight-rate signal coming from the weighing unit 52 and an error signal is issued which error signal is applied to the servo amplifier 62 and thence to the servo motor 64 so that the error signal determines the rate and/or direction of rotation of the motor shaft.

The provision of the electronic system and the use of an especially efficient spring alloy for the spring 56 in the weighing unit 52 provide a relatively low inertia which results in very fast weighing response so that the measurements are accurate and sensitive to rapidly changing loads on the conveyor belt. It is also more sensitive to small weights on the conveyor belt because the force required to drive the electronic sensing device is only a small fraction of the force required for high-friction type mechanical integraters. These two advantages are very important in the present application.

A multitude of other minor advantages result from the electronic nature of the weighing equipment, which equipment is small, light and less expensive to install because of this mechanical simplicity. An actual indication of weight-rate can be remotely located since only light wiring is necessary to couple the various units together.

*Operation*

The present novel coal feeder and weigher is located directly below a plurality of coal bunkers 7a, which bunkers are connected by pipes 7 to the coal feeder. Coal from bunker 7a is gravity-fed into the adjustable feed inlet chute 6 which when properly adjusted controls the flow of coal to the belt 11a of the conveyor on which the coal passes over the weighter 52. A hinged access door 6a is provided in the inlet chute 6 in case of jamming of the coal therein.

The weigher senses the weight of the coal which is constantly fed by the belt to the outlet chute 2 which in turn communicates with a pipe 3 delivering the weighed coal to the pulverizer 4. The belt conveyor is driven through a reducer 32 by a motor 30 the speed of which is adjustable in order to determine the rate of delivery of the coal to the pulverizer. The design of the feed inlet chute is such that if the coal feeder conveyor belt 11a is not running, the coal will stand in the chute with no ill effect on the equipment. Thus, the rate at which the motor 30 revolves directly determines the rate of coal feed to the pulverizer. Once the coal passes through the chute 3 it is then immediately pulverized and blown into the furnace 5. The scraper conveyor 21 is also driven by the motor 30 through drive gear 36 which drive the scraper conveyor at approximately half the speed of the belt 11a, the return run 11d of which lies on the transverse scraper element 26. The scraper conveyor 21 moves in the same direction as the faster moving return run 11d of the belt conveyor, and this speed differential causes a wiping action between the return run 11d of the belt conveyor and each of the scrapers 26 located therebelow. The lower run of the scraper conveyor rides on the plate 22c which catches any coal which may spill from the belt conveyor or which is dislodged therefrom by the action of the scrapers 26 on the belt. If for any reason the belt conveyor becomes disabled, it can be withdrawn from the tank, FIG. 3, and once removed entirely, the scraper conveyor could handle sufficient coal to keep the furnace running under normal conditions.

The belt speed pickup 50, driven by the roller 16, measures the speed of the conveyor belt and delivers a signal the amplitude of which is directly proportional to the speed of the belt. This speed signal is delivered to the power amplifier 60, FIG. 4, in which the power of the signal is increased to a useful level. This signal is fed from the power amplifier to the weigher 52 which measures the instantaneous weights of the load on the conveyor belt and converts this information into an electrical signal. The actual transducer 58 which performs the weight measuring function within the weigher 52 comprises a linear variable differential transformer (TVDT) which is excited by the belt speed signal from the power amplifier 60. This differential transformer comprises a primary winding and two pairs of secondary windings positioned on a magnetic core. A small iron core forms a part of the magnetic circuit and is movable with respect to the windings. The core is linked to the idler 54 which is supported on the spring 56 in such a way that the amount by which the idler 54 is depressed by passage of material on the belt thereover corresponds with the displacement of the movable core with respect to the coils. The position of the core therefore is directly determined by the weight of the load on the conveyor belt. The primary winding of the differential transformer is excited by the amplified belt speed signal from the power amplifier 60. The secondary windings are connected in series opposition and the core is located with respect thereto such that the voltages in the secondary windings cancel when the core is in zero-weight position. However, when the load of the conveyor's belt displaces the idler 54, the movable core is deflected so as to unbalance the secondary windings. Therefore, a resultant voltage appears across the secondary windings the magnitude of which represents the product of the belt speed and the conveyor load weight. This voltage is known as the weight-rate signal.

The weight-rate signal enters the summing network, is added vectorially to a feedback signal of opposite phase and results in an error signal. This error signal is the result of comparing in the summing network 61 the weight-rate signal with the feedback signal coming from the velocity tachometer 66 which is driven by the shaft of the servo motor 64. When the circuit elements are properly adjusted the output of the summing network or error signal represents the mathematical difference between the weight-rate signal and the feedback signal which is proportional to the actual velocity of the motor 64 and tachometer generator 66. The error signal is applied through the amplifier 62 to the motor 64 to control its speed. When the speed of motor 64 is exactly proportional to the weight-rate signal, the feedback signal will cancel the weight-rate signal to reduce the error signal to zero and the servo motor will continue to run at the same speed. If the weight-rate signal increases or decreases it will become larger or smaller than the feedback signal to produce an error signal of appropriate phase to increase or decrease the motor speed to make it again proportional to the weight-rate signal. A complete circuit for carrying out this operation is more fully described and claimed in my copending application Serial No. 786,126, filed January 12, 1959 and since it, per se, forms no part of the present invention it will not be further described herein.

If desired, the circuit of FIG. 4 can be used for the purpose of automatically controlling the feed to the furnace. For this purpose the motor 64, present FIG. 4, rotates a regulator 69 which can be used to automatically control the speed of the motor 30 and thereby the rate of feed to the furnace. It is intended that this type of circuit can also be employed along with the counter 68.

It is also to be understood that the present coal feeder can be connected with automatic computing equipment of a known type controlled by signals received from furnace indicators to control the rate of feed of coal by the present novel feeding and weighing apparatus in response to steam demand from the furnace. For example, such a system may be arranged so that the fuel input to the furnace is regulated to maintain a constant steam pressure with steam flow as measured by the steam flow transmitter being the dominant influence on all controls. So long as the steam pressure controller is satisfied that the steam pressure is correct, the main steam flow transmitter controls both the fuel and air for combustion. Any deviation in steam pressure exerts a correcting influence over the steam flow signal to the fuel feeder.

Air for combustion would be arranged to be controlled by the steam flow signal, corrected by a balance between the actual weighed-fuel input signal and the total measured air flow signal. In the event that fuel-air ratio changes are desired, as observed by the operator, a panel mounted air-fuel ratio relay may be provided to make this ratio change. Once this ratio has been set, the system will automatically control to the new air-fuel ratio. The operator is protected from making too great a change on this relay by an automatic fuel cutback system. This system would function to limit fuel input to the boiler in the event air for combustion is actually not delivered to the boiler in the amount required by the control system. Such condition might occur through mal-functioning of the fans, or equipment associated with the fans or an over-adjustment of the fuel-air ratio relay. The furnace draft would be controlled by the forced draft fan vanes with means provided for supplementary damper control. Provision for changes in the furnace draft would also be made on the panel. In the event of failure of the induced draft fan, automatic shutoff dampers would be provided to protect against the complete loss of air, and a circuit would be provided to double the steam flow influence to the induced draft fan speed controller which is still in operation.

This invention is not to be limited to the exact form of the invention shown in the present drawings, for obviously changes may be made therein within the scope of the following claims.

What is claimed is:

1. Bulk material feeding and weighing apparatus comprising in combination a frame; material inlet means and outlet means; a conveyor having upper and return runs supported by the frame and located to receive material from the inlet means on its upper run and to discharge the material into the outlet means; drive means on the frame for advancing the conveyor; a weigher supporting a portion of the upper run of the conveyor and responsive to instantaneous weights of material conveyed thereby; conveyor speed measuring means responsive to the instantaneous rates of advance of the conveyor; totalizer means connected with the weigher and the speed measuring means and integrating their measurements over a period of time to determine the quantity of material delivered by the apparatus, and scraper and scavenging means comprising a second endless conveyor below and parallel with the material conveyor and having an upper run and a lower run; a material catching plate below the second conveyor; the second conveyor including scrapers disposed transversely thereof; and coupling means between said drive means and said second conveyor for advancing the latter out of synchronism with the advance of the material conveyor, the scrapers wiping the return run of the material conveyor along the upper run of the second conveyor and wiping said plate toward the outlet means along the lower run of the second conveyor.

2. In apparatus as set forth in claim 1, said second conveyor being open between said scrapers to permit material to fall therethrough onto the plate, and said material conveyor being removably disposed between the inlet means and the second conveyor, whereby when the material conveyor is removed from the frame the second conveyor will discharge material from the inlet means into the outlet means.

3. In apparatus as set forth in claim 2, trackways on said frame and rollers on said material conveyor riding on the trackways whereby the material conveyor can be rolled away from the space between the inlet means and said second conveyor.

4. Bulk material feeding and weighing apparatus comprising in combination a tank having at least one opening; inlet means extending thereinto and outlet means extending therefrom; closure means for closing said opening; a frame in said tank; a conveyor having upper and return runs supported by the frame and located to receive material from the inlet means on its upper run and to discharge the material into the outlet means; drive means for advancing the conveyor; and a weigher supporting a portion of the upper run of the conveyor responsive to the weight of materials conveyed thereby, and scraper and scavenging means comprising a second endless conveyor below and parallel with the material conveyor and having an upper run and a lower run; a material catching plate below the second conveyor; the second conveyor including scrapers disposed transversely thereof; and coupling means between said drive means and said second conveyor for advancing the latter out of synchronism with the advance of the material conveyor, the scrapers wiping the return run of the material conveyor along the upper run of the second conveyor and wiping said plate toward the outlet means along the lower run of the second conveyor.

5. In apparatus as set forth in claim 4, said second conveyor being open between said scrapers to permit material to fall therethrough onto the plate, and said material conveyor being removably disposed between the inlet means and the second conveyor opposite said opening whereby when the material conveyor is removed from the tank the second conveyor will discharge material from the inlet means into the outlet means.

6. In apparatus as set forth in claim 5, trackways on said frame and rollers on said material conveyor riding on the trackways whereby the material conveyor can be rolled away from the space between the inlet means and said second conveyor.

7. Bulk material feeding apparatus comprising a frame; material inlet means and outlet means; an endless conveyor supported by the frame and having a material-conveying run and a return run, said conveyor being located to receive material from the inlet means and to discharge the material into the outlet means; drive means on the frame for advancing the conveyor; scraper means for dislodging materials adhering to the conveyor, said scraper means underlying the return run of the conveyor; and material scavenging means actuated by said drive means for depositing the material dislodged by the scraper into the outlet means, said scraper and scavenging means comprising a second endless conveyor below and parallel with the material conveyor and having an upper run and a lower run; a material catching plate below the second conveyor; the second conveyor including scrapers disposed transversely thereof; and coupling means between said drive means and said second conveyor for advancing the latter out of synchronism with the advance of the material conveyor, the scrapers wiping the return run of the material conveyor along the upper run of the second conveyor and wiping said plate toward the outlet means along the lower run of the second conveyor.

8. In apparatus as set forth in claim 7, said second conveyor being open between said scrapers to permit material to fall therethrough onto the plate, and said material conveyor being removably disposed between the inlet means and the second conveyor, whereby when the material conveyor is removed from the frame the second conveyor will discharge material from the inlet means into the outlet means.

9. In apparatus as set forth in claim 8, trackways on said frame and rollers on said material conveyor riding on the trackways whereby the material conveyor can be rolled away from the space between the inlet means and said second conveyor.

References Cited in the file of this patent

UNITED STATES PATENTS

| | | |
|---|---|---|
| 2,157,301 | Neuman | May 9, 1939 |
| 2,212,125 | Peebles | Aug. 20, 1940 |
| 2,371,040 | Fisher | Mar. 6, 1945 |
| 2,404,937 | Anderson | July 30, 1946 |
| 2,549,908 | Johansen | Apr. 24, 1951 |
| 2,857,151 | Brabender | Oct. 21, 1958 |